Patented July 31, 1928.

1,679,186

UNITED STATES PATENT OFFICE.

JOSEF SZÜCS, OF VIENNA, AUSTRIA, ASSIGNOR TO MONTAN- UND INDUSTRIALWERKE VORMALS JOH. DAV. STARCK, OF PRAGUE, CZECHOSLOVAKIA, A COMPANY OF CZECHOSLOVAKIA.

PROCESS FOR PRODUCING CITRIC ACID BY MEANS OF FERMENTATION.

No Drawing. Application filed December 4, 1924, Serial No. 753,803, and in Austria December 19, 1923.

This invention relates to a process for producing citric acid by means of fermentation.

My process consists in cultivating citric acid producers on molasses at a relatively low temperature, that is to say between the limits of 15° and 30° C., selecting cultures adapted for conducting the citric acid fermentation without production of oxalic acid and growing the selected cultures upon a culture medium made up from molasses.

It is known that under appropriate circumstances certain fungi, particularly certain species of the genera citromyces, mucor, aspergillus and penicillium, produce citric acid to a rather large extent. But the weak activity of the fungi and the relatively long period of time required for fermentation involve great risk of infection. For this reason experts seem nowadays to incline to the opinion that for producing citric acid by fermentation on an industrial scale, solid (jelly-like) culture media are indispensable, since by the use thereof infection is localized and formation of acid is thought to be accelerated. Indeed, for a long time it has been known to sow certain species of Aspergillus and Mucor on solid culture media of an area as large as possible, as the mycelium grows thereon not only very rapidly, but also uniformly and to a large extent. But agar-agar and like substances appropriate for use as essential constituents of such gelatinous culturemedia, are rather expensive and therefore this method of producing citric acid is very uneconomical. Trials have also been made to overcome the risk of infection by using artificial combinations of inorganic nutritive salts with additions of carbohydrates for nutrient solutions. Also with such liquid culture media the infection by yeast or bacteria is considerably lessened in comparison with the natural nutrients containing carbohydrates of direct vegetable origin, as are frequently used in the fermentation industry, but also in this case industrial exploitation is impeded by the high costs.

Now I have found that there is no necessity of employing as acid producers exactly determined, morphologically definable species of the fungi used for this purpose, that is of the genera citromyces, mucor, aspergillus and penicillium, but that it is possible to cultivate, by appropriate selection races of all the said kinds, by means of which races citric acid may be successfully produced even when molasses is employed as nutrient medium.

It has for instance been stated by several investigators, that *Aspergillus niger* as a rule produces oxalic acid, which fact can be fully confirmed. But I have found that certain races of said species also produce citric acid and will produce citric acid only, if the temperature is maintained within certain limits and if appropriate nutrients are employed. Nevertheless such races will not show any special morphological characteristics. All that is required is to select the most suitable races from the plurality of the others by the known methods of mycological analysis, for instance by single cell-culture, while comparing experimentally the capacity of producing citric acid at relatively low temperature. In like manner by selecting the most suitable races of Citromyces, Mucor and Penicillium, cultures can be arrived at, by means of which also in liquid culture media, especially in molasses, a satisfactory yield of citric acid is obtainable, provided that the suitable conditions of culture are maintained. In contradistinction to this result the species heretofore used for producing citric acid, when employed in solutions of molasses of such concentration, as is indispensable for obtaining a satisfactory yield, will grow irregularly and the morbidly developing cover will sink down.

In producing citric acid from molasses by said selected fungi a good yield can even be obtained without special attention being required for keeping up perfect sterility during operations, provided that the fermentation is conducted at relatively low temperatures. The temperature most favorable for this purpose is, e. g., for Aspergillus about 20° centigrade. If during the entire time of fermentation with races selected from Aspergillus the temperature does not rise considerably above 20°, not only the highest yield is obtained, but also the risk of infection is most efficaciously obviated. The fungus grown at such low temperature also preserves the capability of forming citric acid at large rate even in the subsequent generations. If on the other hand the fungus is cultivated at higher temperature, it grows very well and produces much citric acid, but the latter is transformed into oxalic acid by further oxidation in accordance with and at the rate of the rise of temperature. Besides the spores deriving from fungi, which in one or several generations had been cultivated at higher temperature, gradually lose their capability of producing a sufficient amount of citric acid, even when sown on a most appropriate culture medium. Finally also the risk of infection considerably increases by rise of temperature. Nevertheless, if care is taken to observe strictly sterile conditions, cultivation may be carried on even at higher temperatures, the time of fermentation being considerably shortened thereby.

As molasses from its origin contains all the substances necessary for fermentation yielding citric acid, and as it is relatively cheap, the described method of producing citric acid represents a process suitable to be worked on a commercial scale.

Under certain circumstances it may be advantageous to render the salt contents of the molasses more suitable or favorable by appropriate additions, for instance by addition of phosphates, or on the other hand to liberate the molasses by refining of certain ingredients, particularly of certain salts, e. g. of potassium salts. In all other respects the conditions for operating are those already known and practised. Preferably the liquid nutrient is spread by pouring it into open flat pans so as to offer a great surface to the growth of the fungi. The height of the layer is also limited by the requirement, that the liquid has to be well acidulated in order to be protected from infection.

The recovery of the citric acid from the nutrient liquid can be effected in known manner. The citric acid may be neutralized during fermentation within the nutrient solution at the rate of its generation by means of alkalies or earth alkalies, but such neutralization is not indispensable. Beside other earth alkalies barium is also appropriate for this purpose. Neutralization of the nutrient solution by means of barium, be it in the form of an oxide, of hydroxide or of a carbonate, offers the advantage, that the citrate of barium is at low temperature less soluble than calcium citrate and therefore will precipitate in the cold. The barium may thereafter be again completely removed in the form of sulphate. I use the term "citric acid producer" in the following claims to include the fungi of the four groups Citromyces, Mucor, Aspergillus and Penicillium.

I claim:

1. Process for producing citric acid by fermentation, which process consists in cultivating citric acid producers on molasses at a temperature between the limits of 15° and 30° C., selecting cultures adapted for conducting the citric acid fermentation without production of oxalic acid and growing the selected cultures—which cannot be distinguished on morphological grounds from other strains of the same species—upon a culture medium made up from molasses.

2. Process for producing citric acid by fermentation, which process consists in cultivating citric acid producers on molasses at a temperature between the limits of 15° and 30° C., selecting cultures adapted for conducting the citric acid fermentation without production of oxalic acid and growing the selected cultures—which cannot be distinguished on morphological grounds from other strains of the same species—upon a culture medium made up from molasses with an addition of nutrient salts.

3. Process for producing citric acid by fermentation, which process consists in cultivating citric acid producers on molasses at a temperature between the limits of 15° and 30° C., selecting cultures adapted for conducting the citric acid fermentation without production of oxalic acid and growing the selected cultures—which cannot be distinguished on morphological grounds from other strains of the same species—upon a culture medium made up from molasses with an addition of nutrient salts and recovering the produced citric acid from the fermented liquor by interaction of compounds forming insoluble citric acid salts.

4. Process for producing citric acid by fermentation which process consists in cultivating citric acid producers on molasses at a temperature between the limits of 15° and 30° C., selecting cultures adapted for conducting the citric acid fermentation without production of oxalic acid and growing the selected cultures—which cannot be distinguished on morphological grounds from other strains of the same species—upon a culture medium made up from molasses with an addition of nutrient salts, and recovering the produced citric acid from the fermented liquor by neutralisation with compounds of barium.

5. Process for producing citric acid by fermentation, which process consists in cultivating citric acid producers on molasses at a temperature between the limits of 15° and 30° C., selecting cultures adapted for conducting the citric acid fermentation without production of oxalic acid and growing the selected cultures—which cannot be distinguished on morphological grounds from other strains of the same species—upon a culture medium made up from molasses with an addition of nutrient salts, and recovering the produced citric acid from the fermented liquor at the rate of its formation during fermentation by neutralization with compounds of barium.

6. The process for producing citric acid by fermentation, which consists in employing molasses as culture medium, conducting the fermentation with strains selected from citric acid producers by cultivation on molasses at a temperature between the limits of 15° and 30° C., and recovering the citric acid produced from the fermented liquor.

In testimony whereof I have affixed my signature.

JOSEF SZÜCS.